(12) United States Patent
Dong et al.

(10) Patent No.: US 12,101,117 B2
(45) Date of Patent: Sep. 24, 2024

(54) PORT IDENTIFICATION METHOD, APPARATUS, AND SYSTEM

(71) Applicant: HUAWEI TECHNOLOGIES CO., LTD., Guangdong (CN)

(72) Inventors: Zhenhua Dong, Dongguan (CN); Xiaolong Dong, Dongguan (CN); Biao Qi, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 58 days.

(21) Appl. No.: 18/067,722

(22) Filed: Dec. 18, 2022

(65) Prior Publication Data

US 2023/0208515 A1  Jun. 29, 2023

Related U.S. Application Data

(63) Continuation of application No. PCT/CN2021/079724, filed on Mar. 9, 2021.

(30) Foreign Application Priority Data

Jun. 18, 2020 (CN) .......................... 202010559502.3

(51) Int. Cl.
*H04B 10/071* (2013.01)
*H04B 10/079* (2013.01)
*H04Q 11/00* (2006.01)

(52) U.S. Cl.
CPC ..... *H04B 10/071* (2013.01); *H04B 10/07955* (2013.01); *H04Q 11/0005* (2013.01); *H04Q 11/0067* (2013.01); *H04Q 2011/0015* (2013.01); *H04Q 2011/0083* (2013.01)

(58) Field of Classification Search
CPC .................................................. H04B 10/071
See application file for complete search history.

(56) References Cited

U.S. PATENT DOCUMENTS

2006/0110161 A1\* 5/2006 Cho .................... H04J 14/0246
398/72
2022/0247507 A1\* 8/2022 Zhou ................... H04J 14/0204
2023/0079705 A1\* 3/2023 Lin .................... H04Q 11/0067
398/58

FOREIGN PATENT DOCUMENTS

CN         111885434 A      11/2020

\* cited by examiner

*Primary Examiner* — Shi K Li
(74) *Attorney, Agent, or Firm* — Gregg Jansen (57) ABSTRACT

This application provides a port identification method, apparatus, and system, and belongs to the field of optical communications technologies. According to this application, a connection relationship between the ONT and the optical splitter and a connection relationship between the ONT and the port of the optical splitter can be accurately identified.

12 Claims, 5 Drawing Sheets

PORT IDENTIFICATION METHOD, APPARATUS, AND SYSTEM

CROSS-REFERENCE TO RELATED APPLICATIONS

This application is a continuation of International Application No. PCT/CN2021/079724, filed on Mar. 9, 2021, which claims priority to Chinese Patent Application No. 202010559502.3, filed on Jun. 18, 2020. The disclosures of the aforementioned applications are hereby incorporated by reference in their entireties.

TECHNICAL FIELD

This application relates to the field of optical communications technologies, and in particular, to a port identification method, apparatus, and system.

BACKGROUND

A passive optical network system includes an optical line terminal (OLT), an optical distribution network (ODN), and a plurality of optical access network user terminals. The optical access network user terminal is an optical network unit (ONU) or an optical network terminal (ONT). The ODN is generally divided into four parts: an optical splitter, a feeder fiber, a distribution fiber, and a drop fiber. The feeder fiber refers to an optical fiber between the OLT and the ODN. The distribution fiber refers to an optical fiber between different levels of optical splitters. The drop fiber refers to an optical fiber between an optical splitter and the optical access network user terminal. In the ODN, an optical signal is transmitted from the OLT to a plurality of user terminals by using a point-to-multipoint connection method. The ODN has characteristics such as a wide coverage area, a huge quantity of branches, and a complex scenario. In addition, the ODN has no power supply. As a result, it is difficult to identify a port connection relationship of the optical splitter in the ODN.

In a related technology, different reflection components are disposed for different ports of the optical splitter, and a port connected to an ONT in the ODN is identified by using a tunable Optical Time Domain Reflectometer (OTDR). Reflection components with different center wavelengths are disposed at different ports of each optical splitter at each level of the ODN, and center wavelengths of reflection components disposed at ports of optical splitters at different levels are different. For example, the ODN includes two levels of optical splitters. A first level of optical splitters is a 1*8 optical splitter, and a second level of optical splitters is eight 1*8 optical splitters. Center wavelengths of reflection components of eight ports of the 1*8 optical splitter of the first level of optical splitters are λ1 to λ8, and center wavelengths of reflection components of eight ports of each 1*8 optical splitter of the second level of optical splitters are λ9 to λ16. Test optical signals of λ1 to λ8 and λ9 to λ16 are respectively transmitted by using the tunable OTDR. An ONT connected to a second-level optical splitter determines, in optical power of test optical signals received by the ONT, a port corresponding to a wavelength of a test optical signal with minimum optical power as a port connected to the ONT.

In the related technology, the port connected to the ONT is determined based on the optical power of the test optical signals received by the ONT. Because the optical power of the test optical signal received by the ONT is controlled by the reflection component disposed at the port, accuracy of the center wavelength of the reflection component is crucial. However, the optical splitter in the ODN may be deployed outdoors, and the center wavelength of the reflection component may shift. In this way, when the tunable OTDR transmits a test optical signal of a nominal center wavelength of the reflection component, the reflection component does not reflect the test optical signal of the center wavelength. Therefore, an ONT actually connected to the port receives the test optical signal of the center wavelength, and determines that the ONT is not connected to the port, which causes an error in determining a connected port.

SUMMARY

Embodiments of this application provide a port identification method, apparatus, and system, so that a port connected to an ONT can be accurately identified by using this application.

According to a first aspect, a port identification method is provided. The method includes: obtaining a first wavelength respectively corresponding to at least one optical splitter in an ODN, where for each optical splitter, the first wavelength is a wavelength corresponding to a test optical signal with maximum receive power after being reflected by a reflection component of a target port of the optical splitter during transmission in the ODN; determining a center wavelength shift of a reflection component of each port of the at least one optical splitter based on the first wavelength corresponding to the at least one optical splitter and a nominal center wavelength of a reflection component of a target port of the at least one optical splitter; determining a current center wavelength of the reflection component of each port of the at least one optical splitter based on the center wavelength shift of the reflection component of each port of the at least one optical splitter; and determining, based on the current center wavelength of the reflection component of each port of the at least one optical splitter in the ODN, a port connected to a target ONT in the ODN.

In the solution shown in this application, the port identification method may be performed by a port identification apparatus. When the port identification apparatus determines the port connected to the ONT in the ODN, for any one of the at least one optical splitter, different reflection components are disposed at different ports of the optical splitter. Each reflection component may be any component that can reflect a test optical signal of a wavelength, such as a reflection grating. For each of the at least one optical splitter, the port identification apparatus may obtain a wavelength of a test optical signal with maximum reflectivity that is reflected by the reflection component of the target port of the optical splitter, that is, obtain a first wavelength corresponding to the optical splitter. For each of the at least one optical splitter in the ODN, the port identification apparatus may obtain a nominal center wavelength of the reflection component of the target port of the optical splitter. Then, the port identification apparatus determines a center wavelength shift of a reflection component of each port of the optical splitter by using the first wavelength corresponding to the optical splitter and the nominal center wavelength of the reflection component of the target port of the optical splitter. For any one of the at least one optical splitter, the port identification apparatus may use this manner to determine the center wavelength shift of the reflection component of each port of the at least one optical splitter. For each of the at least one optical splitter, the port identification apparatus may add the center wavelength shift of the reflection component of each port of the optical splitter to the nominal center wavelength of the reflection component of each port of the optical splitter, to obtain a current center wavelength of the reflection component of each port of the optical splitter. A tunable OTDR may sequentially transmit, based on a preset sequence, a test optical signal of the current center wavelength of the reflection component disposed at each port of the at least one optical splitter. The test optical signal of the wavelength is transmitted through the ODN, and the target ONT may detect receive power of a received test optical signal of each center wavelength. Then, the target ONT sends the receive power to the port identification apparatus in a detected sequence. The port identification apparatus may determine a center wavelength corresponding to each receive power, and determine, based on the center wavelength corresponding to each receive power, the port connected to the target ONT in the ODN. In this way, because the current center wavelength of the reflection component can be obtained, the receive power of the test optical signal received by the target ONT accurately corresponds to the wavelength, so that the determined port connected to the ONT in the ODN can be relatively accurate.

In an embodiment, the obtaining a first wavelength respectively corresponding to at least one optical splitter in an ODN includes:

obtaining a plurality of first correspondences respectively corresponding to the at least one optical splitter in the ODN, where for each optical splitter, each first correspondence is a correspondence between receive power after backscattering and/or reflection and transmission distances when test optical signals of a plurality of wavelengths are respectively transmitted in the ODN, the plurality of wavelengths include a second wavelength, the second wavelength is a nominal center wavelength of a reflection component of any port of the optical splitter, and a wavelength in the plurality of wavelengths other than the second wavelength is determined based on the second wavelength and a target adjustment value; and determining, for each optical splitter in a plurality of first correspondences corresponding to the optical splitter, a first correspondence with maximum receive power at a location of the reflection component of the target port of the optical splitter, and determining a wavelength corresponding to the first correspondence with the maximum receive power as the first wavelength corresponding to the optical splitter.

In the solution shown in this application, a target optical splitter in the at least one optical splitter is used as an example for description. The tunable OTDR may transmit a test optical signal of a center wavelength (that is, a second wavelength) of a reflection component of a target port of the target optical splitter, and record a transmitting time at which the test optical signal of the second wavelength is transmitted. The tunable OTDR records a correspondence between receive power and a receiving time of a received test optical signal of the second wavelength. The tunable OTDR may determine a difference between each receiving time and the transmitting time, and then determine a transmission distance corresponding to each difference. Because the transmission distance corresponds to the receiving time, and the receiving time corresponds to the receive power, a correspondence between the transmission distance and the receive power when the test optical signal of the second wavelength is transmitted in the ODN (that is, a first correspondence corresponding to the second wavelength) is obtained. Then, the tunable OTDR may adjust the second wavelength by the target adjustment value, to obtain a third wavelength, and then the tunable OTDR may transmit a test optical signal of the third wavelength, and record a first correspondence corresponding to the third wavelength. The tunable OTDR adjusts the third wavelength by the target adjustment value, to obtain a fourth wavelength, and then the tunable OTDR may transmit a test optical signal of the fourth wavelength, and record a first correspondence corresponding to the fourth wavelength. The tunable OTDR may continuously adjust a wavelength of a to-be-transmitted test optical signal until the port identification apparatus finds a first wavelength corresponding to the target optical splitter. Then, the tunable OTDR may send the plurality of first correspondences corresponding to the target optical splitter to the port identification apparatus. The port identification apparatus may determine, in the plurality of first correspondences, a first correspondence with maximum receive power at a location of a reflection component of a target port of the target optical splitter, and determine a wavelength corresponding to the first correspondence with the maximum receive power as the first wavelength corresponding to the target optical splitter. In this way, because the wavelength corresponding to the location with the maximum receive power is selected, the first wavelength corresponding to the target optical splitter is relatively accurate.

In an embodiment, the determining, based on the current center wavelength of the reflection component of each port of the at least one optical splitter in the ODN, a port connected to a target ONT in the ODN includes: obtaining first power respectively detected by the target ONT when test optical signals of a plurality of groups of sub-wavelengths are transmitted in the ODN, where each group of sub-wavelengths is determined based on a current center wavelength of a reflection component of a port of the at least one optical splitter, and a distance between each sub-wavelength of any group of sub-wavelengths and a current center wavelength of a reflection component of a port corresponding to the any group of sub-wavelengths is less than a target value; and if first power less than a target threshold exists in a plurality of pieces of first power corresponding to a target group of sub-wavelengths, determining that the port connected to the target ONT in the ODN is a port to which a center wavelength corresponding to the target group of sub-wavelengths belongs.

In the solution shown in this application, for a reflection component of each port of any optical splitter in the ODN, the tunable OTDR may determine, based on a current center wavelength of the reflection component of each port, a group of sub-wavelengths corresponding to the current center wavelength. Then, the tunable OTDR may transmit, based on a preset sequence, test optical signals of a group of sub-wavelengths corresponding to a current center wavelength of each reflection component. In addition, the tunable OTDR may notify the port identification apparatus of the preset sequence. A test optical signal of any sub-wavelength is transmitted in the ODN, and an ONT connected to the ODN may detect first power of a test optical signal received by the ONT. The target ONT sends each detected first power to the port identification apparatus. In this way, the port identification apparatus may obtain first power detected by the target ONT when a plurality of groups of sub-wavelengths are transmitted in the ODN. For the target ONT, the port identification apparatus may determine whether first power less than the target threshold exists in a plurality of pieces of first power corresponding to each group of sub-wavelengths, and if first power less than the target threshold exists in a plurality of pieces of first power corresponding to a target group of sub-wavelengths, the port identification apparatus may determine that the port connected to the target ONT in the ODN is a port to which a center wavelength corresponding to the target group of sub-wavelengths belongs, that is, a port at which a reflection component to which a current center wavelength of the target group of sub-wavelengths belongs is located. In this way, when a port is identified, a test optical signal of one wavelength is converted into test optical signals of a plurality of sub-wavelengths for identification, so that port identification accuracy can be improved.

In an embodiment, the determining a center wavelength shift of a reflection component of each port of the at least one optical splitter based on the first wavelength corresponding to the at least one optical splitter and a nominal center wavelength of a reflection component of a target port of the at least one optical splitter includes: for each optical splitter, determining a difference between a first wavelength corresponding to the optical splitter and a nominal center wavelength of the reflection component of the target port of the optical splitter as a center wavelength shift of a reflection component of each port of the optical splitter.

In the solution shown in this application, for any optical splitter, the port identification apparatus may determine a difference between a first wavelength corresponding to the optical splitter and a nominal center wavelength of a reflection component of a target port of the optical splitter, and determine the difference as a center wavelength shift of a reflection component of each port of the optical splitter. Because reflection components of all ports of a same optical splitter are relatively close to each other, temperature changes of the reflection components of all the ports are the same. Therefore, a center wavelength shift of a reflection component of only one port (that is, a target port) needs to be tested, to obtain current center wavelengths of the reflection components of all the ports of the optical splitter.

According to a second aspect, a port identification system is provided, applied to an ODN. The system includes a tunable OTDR and an OLT.

The tunable OTDR is configured to output test optical signals of a plurality of wavelengths.

The tunable OTDR is further configured to detect receive power and a receiving time of a received test optical signal.

The OLT establishes a communications connection to the tunable OTDR.

The OLT is configured to perform the method according to the first aspect.

According to a third aspect, a port identification apparatus is provided. The apparatus includes a plurality of modules, and the plurality of modules implement, by executing instructions, the port identification method provided in the first aspect.

According to a fourth aspect, a port identification device is provided. The port identification device includes a processor and a memory.

The memory stores computer instructions.

The processor executes the computer instructions to implement the method according to the first aspect.

According to a fifth aspect, a computer-readable storage medium is provided. The computer-readable storage medium stores computer instructions, and when the computer instructions in the computer-readable storage medium are executed by a port identification device, the port identification device is enabled to perform the method according to the first aspect.

According to a sixth aspect, this application provides a computer program product. The computer program product includes computer instructions, and when the computer instructions are executed by a port identification device, the port identification device performs the port identification method according to the first aspect.

DESCRIPTION OF EMBODIMENTS

To make objectives, technical solutions, and advantages of this application clearer, the following further describes implementations of this application in detail with reference to the accompanying drawings.

Figure 1:
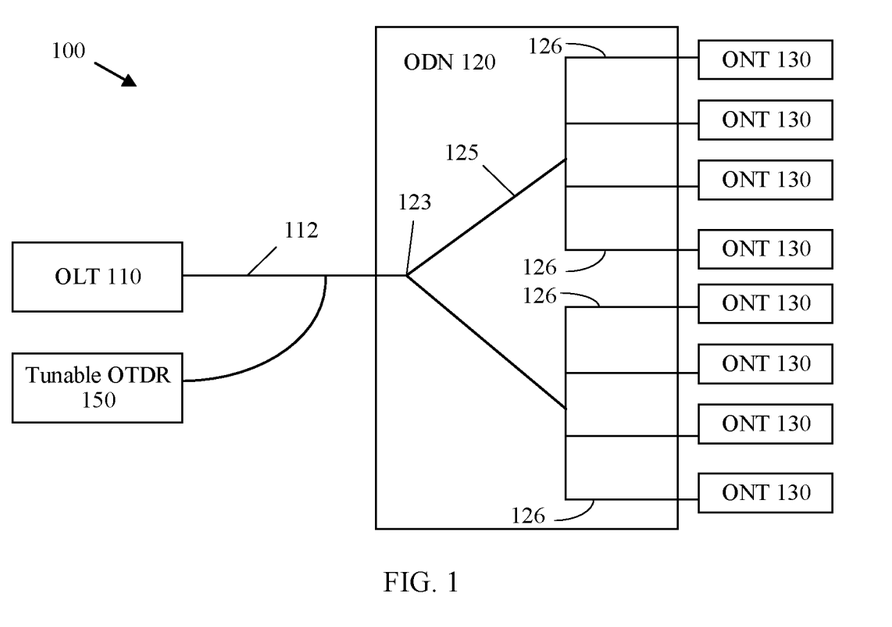
FIG. 1 is a diagram of an application scenario according to an example embodiment of this application.

This application may be applied to a PON system 100. As shown in FIG. 1, a structure of the PON system 100 includes three parts: an OLT 110, an ODN 120, and an optical access network user terminal (such as an ONT) 130. The ODN 120 is generally divided into four parts: an optical splitter 123, a feeder fiber 112, a distribution fiber 125, and a drop fiber 126. The feeder fiber 112 refers to an optical fiber between the OLT 110 and the ODN 120. The distribution fiber 125 refers to an optical fiber between different levels of optical splitters. The drop fiber 126 refers to an optical fiber between an optical splitter 123 and the optical access network user terminal 130. FIG. 1 is a diagram of a structure of an ODN 120 with two levels of optical splitting. An ODN 120 with only one level of optical splitting has only a feeder fiber 112 and a drop fiber 126.

Because the ODN 120 includes a passive component, it is difficult to identify a port connected to an ONT 130 in the ODN 120. In a related technology, different reflection components are disposed for different ports of the optical splitter 123. Reflection components with different center wavelengths are disposed at different ports of each optical splitter at each level of the ODN 120, and center wavelengths of reflection components disposed at ports of optical splitters at different levels are different. The ONT 130 connected to the ODN 120 determines, based on power of a received test optical signal, the port connected to the ONT 130. Because the optical splitter 123 in the ODN 120 may be deployed outdoors, the center wavelength of the reflection component may shift. In this way, when a tunable OTDR 150 transmits a test optical signal of a nominal center wavelength of the reflection component, the reflection component does not reflect the test optical signal of the center wavelength.

Therefore, an ONT 130 actually connected to the port receives the test optical signal of the center wavelength, and determines that the ONT 130 is not connected to the port, which causes an error in determining a connected port.

Based on the foregoing reason, an embodiment of this application provides a port identification method. The method may be performed by a port identification apparatus, and the port identification apparatus may be a hardware device, or may be a software apparatus. When the port identification apparatus is a hardware device, the port identification apparatus may be referred to as a port identification device, the port identification apparatus may be an OLT 110 or the like, and the port identification method may be performed by a board in the OLT 110. When the port identification apparatus is a software apparatus, the apparatus may be a software module or the like deployed on an OLT 110.

In addition, the PON system 100 further includes an apparatus for transmitting a test optical signal. The apparatus may transmit a test optical signal, and detect receive power of a test optical signal reflected back by a reflection component (the reflection component may be a reflection grating). The apparatus for transmitting a test optical signal may be a tunable OTDR 150, 250, 350, or 450, and the tunable OTDR is an OTDR whose wavelength is tunable. The tunable OTDR is an OTDR that is obtained based on an original OTDR and that can transmit test optical signals of a plurality of wavelengths. The plurality of wavelengths include a center wavelength of a reflection component disposed at a port of an optical splitter 123 in the ODN 120. The tunable OTDR 150 may further detect receive power and a receiving time of a received test optical signal. A reason for the receive power herein is as follows: When transmitted in the ODN 120, the test optical signal is reflected or scattered (the scattering may be backscattering) back to the tunable OTDR 150 by an optical fiber in the ODN 120, or reflected back to the tunable OTDR 150 by a reflection component disposed at a port of an optical splitter in the ODN 120.

Figure 2:
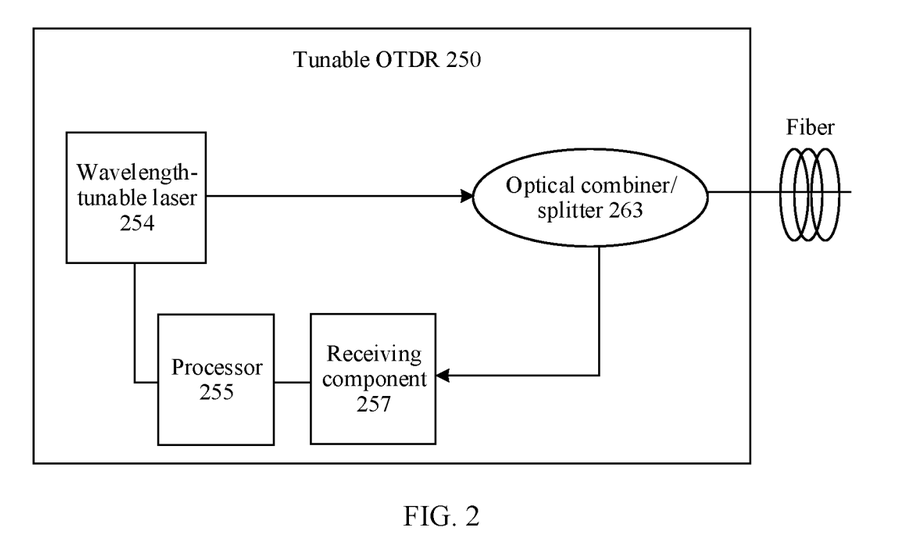
FIG. 2 is a diagram of a structure of a tunable OTDR according to an example embodiment of this application.

FIG. 2 is a diagram of a tunable OTDR 250 according to an example embodiment. The tunable OTDR 250 in this embodiment includes a wavelength-tunable laser 254, an optical combiner/splitter (such as a coupler) or a circulator 263, a receiving component 257, a processor 255, and the like. The wavelength-tunable laser 254 establishes a connection to the processor, and the processor 255 establishes a connection to the receiving component. The wavelength-tunable laser 254 is configured to output test optical signals of a plurality of wavelengths. The optical combiner/splitter or the circulator 263 is configured to send test optical signals and to receive test optical signals. The receiving component 257 is configured to detect receive power. The processor 255 is configured to record a receiving time and the like. Only some components are shown in FIG. 2.

It should be noted herein that, when a test optical signal is used to detect a center wavelength shift of a reflection component, the test optical signal may be an optical pulse signal. The wavelength-tunable laser generates a direct current optical signal, and the optical pulse signal is generated by an optical modulator. Then, the optical pulse signal is output to the optical combiner/splitter.

Figure 3:
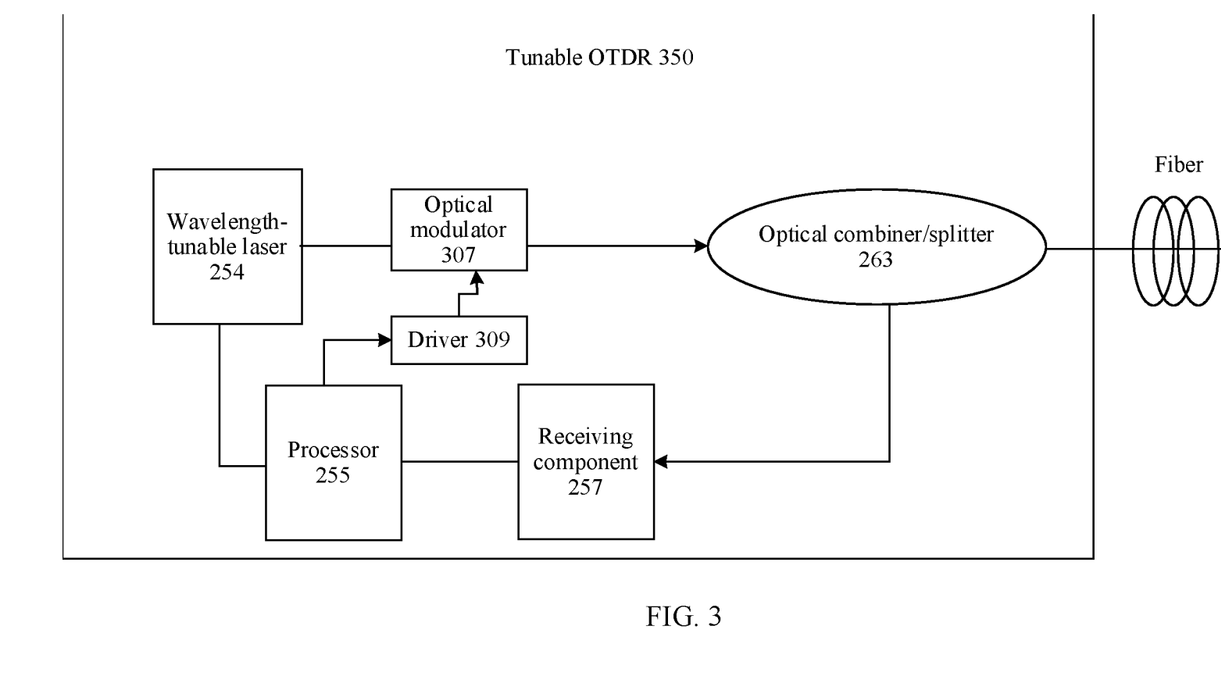
FIG. 3 is a diagram of a structure of a tunable OTDR according to an example embodiment of this application.

FIG. 3 shows a tunable OTDR 350 according to another example embodiment. In this embodiment, the tunable OTDR 350 additionally includes an optical modulator 307 coupled between the wavelength-tunable laser 254 and the optical combiner/splitter 263, and a driver 309 coupled between the processor 255 and the optical modulator 307.

The processor 255 generates an electrical pulse signal, and a driver 309 drives the optical modulator 307 to generate an optical pulse signal. Alternatively, the processor 255 generates a control signal to control the driver 309 to generate an electrical pulse signal, and the electrical pulse signal drives the optical modulator 307 to generate an optical pulse signal.

Alternatively, the wavelength-tunable laser 254 may directly generate an optical pulse signal. Then, the optical signal pulse is output to the optical combiner/splitter 263. If the test optical signal is a direct current optical signal, the wavelength-tunable laser 254 directly generates the direct current optical signal, and the optical modulator 307 does not modulate the direct current optical signal. If the test optical signal is a direct current optical signal corresponding to FIG. 4, the wavelength-tunable laser 254 directly generates the direct current optical signal.

Figure 4:
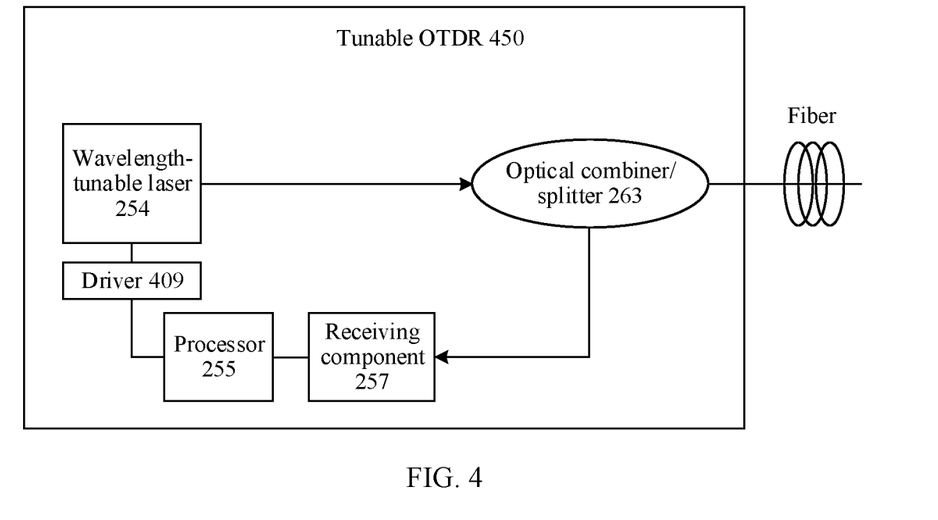
FIG. 4 is a diagram of a structure of a tunable OTDR according to an example embodiment of this application.

FIG. 4 shows a tunable OTDR 450 according to another example embodiment. In this embodiment, the tunable OTDR 350 includes a driver 409 coupled between the wavelength-tunable laser 254 and the processor 255. The processor 255 generates an electrical pulse signal, which is amplified by the driver 409, and then the wavelength-tunable laser 254 is driven to generate an optical pulse signal. Alternatively, the processor 255 generates a control signal to control the driver 409 to generate an electrical pulse signal, and the electrical pulse signal drives the wavelength-tunable laser 254 to generate an optical pulse signal.

When a test optical signal is a test optical signal used to determine a connection relationship between an ONT and a port of an optical splitter, the test optical signal may be a pulse test optical signal, or may be a direct current test optical signal. This is not limited in this embodiment of this application. If the test optical signal is a direct current optical signal, corresponding to FIG. 3, the wavelength-tunable laser 254 directly generates the direct current optical signal, and the optical modulator 307 does not modulate the direct current optical signal. If the test optical signal is a direct current optical signal, corresponding to FIG. 4, the wavelength-tunable laser 254 directly generates the direct current optical signal.

It should be noted herein that if both a service optical signal and a test optical signal exist, a component for combining the service optical signal and the test optical signal, such as a wavelength division multiplexer, may be further disposed between the tunable OTDR 250/350/40 and the ODN 120. In this case, the service optical signal passes through the component when transmitted between the OLT 110 and the ODN 120.

Figure 5:
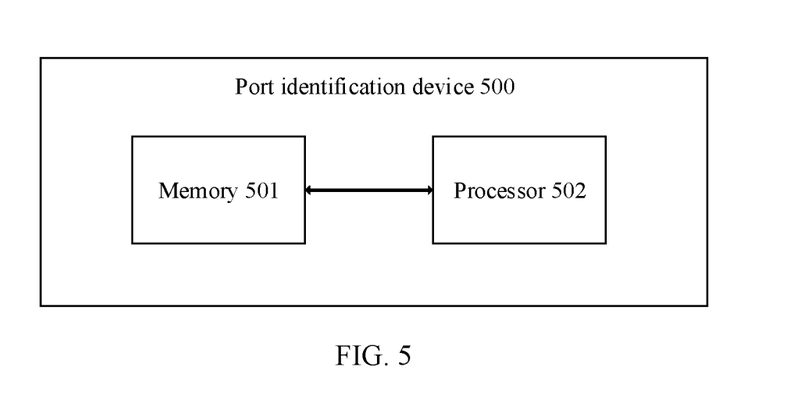
FIG. 5 is a diagram of a structure of a port identification device according to an example embodiment of this application.

FIG. 5 shows a port identification device 500 according to an embodiment. The port identification device 500 includes a memory 501 and a processor 502. The memory 501 may be a read-only memory (ROM), a static storage device, a dynamic storage device, or the like. The memory 501 may store computer instructions. When the computer instructions stored in the memory 501 are executed by the processor 502, the processor 502 is configured to perform the port identification method. The memory may also store data. The processor 502 may be a general-purpose central processing unit (CPU), an ASIC, a graphics processing unit (GPU), or any combination thereof. The processor 502 may include one or more chips.

Figure 6:
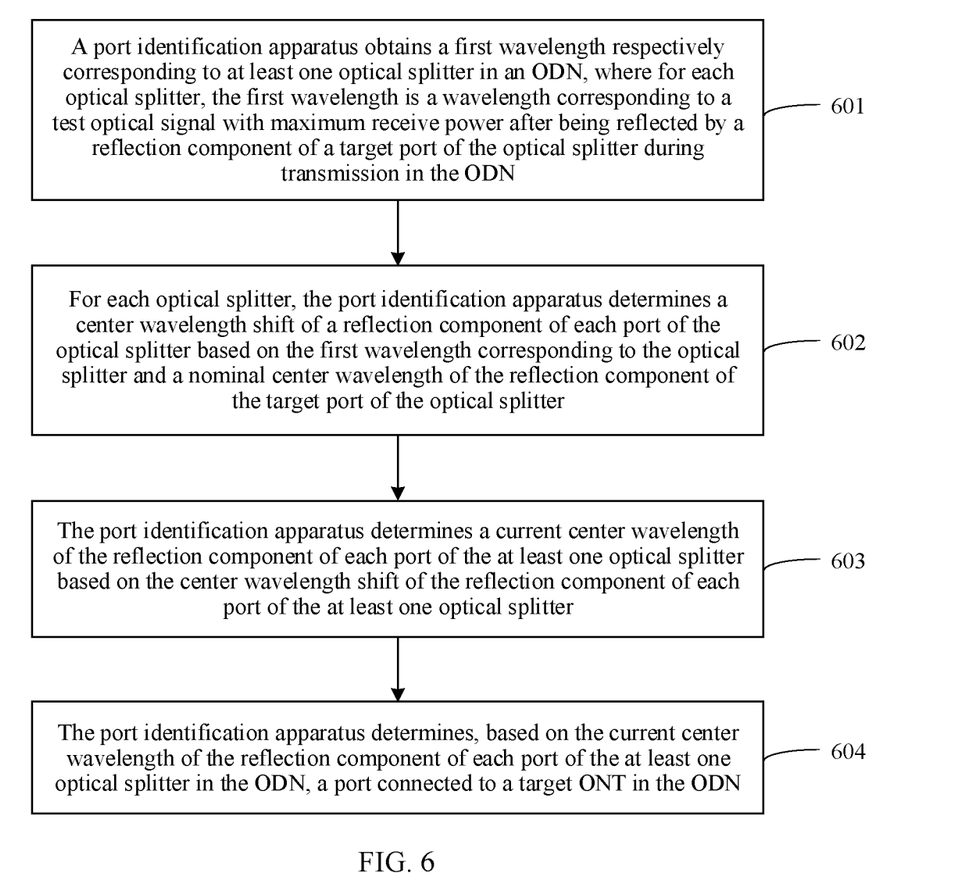
FIG. 6 is a flowchart of a port identification method according to an example embodiment of this application.

FIG. 6 is a flowchart of a port identification method according to an example embodiment. A procedure of performing the port identification method is provided, and the port identification apparatus is an OLT.

Step 601: The port identification apparatus obtains a first wavelength respectively corresponding to at least one optical splitter in an ODN, where for each optical splitter, the first wavelength is a wavelength corresponding to a test optical signal with maximum receive power after being reflected by a reflection component of a target port of the optical splitter during transmission in the ODN.

The target port is any port of the optical splitter.

In this embodiment, when the port identification apparatus determines a port connected to an ONT in the ODN, when the at least one optical splitter in the ODN is a plurality of optical splitters, for any one of the at least one optical splitter, different reflection components are disposed at different ports of the optical splitter, and each reflection component may be any component that can reflect a test optical signal of a wavelength, such as a reflection grating. When the at least one optical splitter in the ODN is one optical splitter, different reflection components are disposed at different ports of the one optical splitter, and each reflection component may be any component that can reflect a test optical signal of a wavelength, such as a reflection grating.

For each of the at least one optical splitter, the port identification apparatus may obtain a wavelength of a test optical signal with maximum reflectivity that is reflected by the reflection component of the target port of the optical splitter, that is, obtain a first wavelength corresponding to the optical splitter. That is, the wavelength corresponding to the test optical signal with the maximum receive power after being reflected by the reflection component of the target port during transmission in the ODN is obtained.

In this way, the port identification apparatus may obtain the first wavelength respectively corresponding to the at least one optical splitter in the ODN.

Step 602: For each optical splitter, the port identification apparatus determines a center wavelength shift of a reflection component of each port of the optical splitter based on the first wavelength corresponding to the optical splitter and a nominal center wavelength of the reflection component of the target port of the optical splitter.

The nominal center wavelength is a wavelength of an optical signal that is reflected most in an ideal condition after the reflection component is fabricated.

In this embodiment, for each of the at least one optical splitter in the ODN, the port identification apparatus may obtain the nominal center wavelength of the reflection component of the target port of the optical splitter. Then, the port identification apparatus determines the center wavelength shift of the reflection component of each port of the optical splitter by using the first wavelength corresponding to the optical splitter and the nominal center wavelength of the reflection component of the target port of the optical splitter. For any one of the at least one optical splitter, the port identification apparatus may use this manner to determine a center wavelength shift of a reflection component of each port of the at least one optical splitter.

Step 603: The port identification apparatus determines a current center wavelength of the reflection component of each port of the at least one optical splitter based on the center wavelength shift of the reflection component of each port of the at least one optical splitter.

In this embodiment, for each of the at least one optical splitter, the port identification apparatus may add the center wavelength shift of the reflection component of each port of the optical splitter to the nominal center wavelength of the reflection component of each port of the optical splitter, to obtain a current center wavelength of the reflection component of each port of the optical splitter.

It should be noted that the "current" herein refers to a time point at which the shift is determined.

Step 604: The port identification apparatus determines, based on the current center wavelength of the reflection component of each port of the at least one optical splitter in the ODN, a port connected to a target ONT in the ODN.

The target ONT may be any ONT connected to the ODN.

In this embodiment, in step 601 to step 603, the current center wavelength of the reflection component disposed at each port of the at least one optical splitter is determined.

A tunable OTDR may sequentially transmit, based on a preset sequence, a test optical signal of the current center wavelength of the reflection component disposed at each port of the at least one optical splitter. The test optical signal of the wavelength is transmitted through the ODN, and the target ONT may detect receive power of a received test optical signal of each center wavelength. Then, the target ONT sends the receive power to the port identification apparatus in a detected sequence. The port identification apparatus may determine a center wavelength corresponding to each receive power, calculate a difference between maximum receive power in the receive power and remaining receive power, and determine receive power whose difference is greater than a first value; and determine a port at which a reflection component to which a center wavelength corresponding to the receive power whose difference is greater than the first value belongs is located as the port connected to the target ONT in the ODN. Alternatively, the port identification apparatus may determine a center wavelength corresponding to minimum receive power in the receive power, and determine a port at which a reflection component to which the center wavelength belongs is located as the port connected to the target ONT in the ODN.

Herein, the target ONT sends the receive power to the port identification apparatus. Certainly, alternatively, the port identification apparatus may send the preset sequence and a port corresponding to each center wavelength (that is, a port at which a reflection component to which the center wavelength belongs is located) to the target ONT. The target ONT determines, in the foregoing manner, the port connected to the target ONT in the ODN. After determining the port connected to the target ONT in the ODN, the target ONT may send the port connected to the target ONT in the ODN to the port identification apparatus.

In this way, because the current center wavelength of the reflection component can be obtained, the determined port connected to the ONT in the ODN can be relatively accurate.

In step 601, the port identification apparatus may obtain the first wavelength in the following manner, and processing is as follows.

The port identification apparatus obtains a plurality of first correspondences respectively corresponding to the at least one optical splitter in the ODN, where for each optical splitter, each first correspondence is a correspondence between receive power after backscattering and/or reflection and transmission distances when test optical signals of a plurality of wavelengths are respectively transmitted in the ODN, the plurality of wavelengths include a second wavelength, the second wavelength is a nominal center wavelength of a reflection component of any port of the optical splitter, and a wavelength in the plurality of wavelengths other than the second wavelength is determined based on the second wavelength and a target adjustment value; and determines, for each optical splitter in a plurality of first correspondences corresponding to the optical splitter, a first correspondence with maximum receive power at a location of the reflection component of the target port of the optical splitter, and determines a wavelength corresponding to the first correspondence with the maximum receive power as the first wavelength corresponding to the optical splitter.

The target adjustment value may be preset, and is used to adjust a wavelength of a test optical signal. A value of the target adjustment value is determined by an adjustment amplitude of the wavelength of the test optical signal. The target port is any port of the optical splitter.

In this embodiment, a target optical splitter in the at least one optical splitter is used as an example for description.

The tunable OTDR may transmit a test optical signal of a center wavelength (that is, a second wavelength) of a reflection component of a target port of the target optical splitter, and record a transmitting time at which the test optical signal of the second wavelength is transmitted. The tunable OTDR records a correspondence between receive power and a receiving time of a received test optical signal of the second wavelength. The tunable OTDR may determine a difference between each receiving time and the transmitting time, and then determine, by using a transmission distance formula (D)=(c*t)/2n, a transmission distance corresponding to each difference. In this formula, c represents a speed of light, t represents the difference, and n represents a refractive index of an optical fiber in the ODN. Because the transmission distance corresponds to the receiving time, and the receiving time corresponds to the receive power, a correspondence between the transmission distance and the receive power when the test optical signal of the second wavelength is transmitted in the ODN (that is, a first correspondence corresponding to the second wavelength) is obtained. For example, it is assumed that the ODN includes one optical splitter, and for a center wavelength (second wavelength) of a reflection component of a target port of the optical splitter, a first correspondence corresponding to the second wavelength is represented by using FIG. 7.

Figure 7:
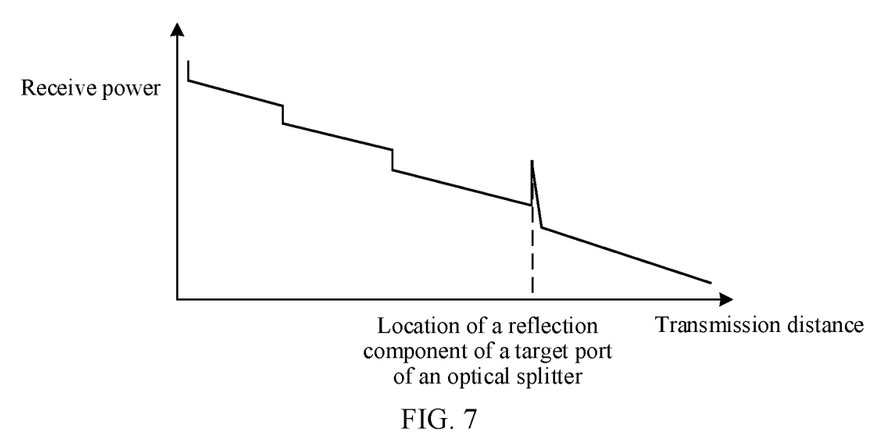
FIG. 7 is a diagram of a first correspondence according to an example embodiment of this application.

Then, the tunable OTDR may adjust the second wavelength by the target adjustment value, to obtain a third wavelength, and then the tunable OTDR may transmit a test optical signal of the third wavelength, and record a first correspondence corresponding to the third wavelength. The tunable OTDR adjusts the third wavelength by the target adjustment value, to obtain a fourth wavelength, and then the tunable OTDR may transmit a test optical signal of the fourth wavelength, and record a first correspondence corresponding to the fourth wavelength. The tunable OTDR may continuously adjust a wavelength of a to-be-transmitted test optical signal until the port identification apparatus finds a first wavelength corresponding to the target optical splitter. It should be noted herein that the adjustment by the target adjustment value may be a wavelength increase or a wavelength decrease.

Then, the tunable OTDR may send the plurality of first correspondences corresponding to the target optical splitter to the port identification apparatus. The port identification apparatus may determine, in the plurality of first correspondences, a first correspondence with maximum receive power at a location of a reflection component of a target port of the target optical splitter, and determine a wavelength corresponding to the first correspondence with the maximum receive power as the first wavelength corresponding to the target optical splitter. It should be noted herein that the location of the reflection component of the target port of the target optical splitter is actually a location at which a distance is a distance between the reflection component of the target port and the tunable OTDR.

In addition, the port identification apparatus may alternatively adjust the second wavelength by using the target adjustment value, and indicate a wavelength of a test optical signal to be transmitted by the tunable OTDR. After the port identification apparatus determines the first wavelength corresponding to the target optical splitter, the port identification apparatus may indicate the tunable OTDR to transmit a test optical signal for determining a first wavelength corresponding to another optical splitter.

Optionally, the "at least one" includes one or more. When the "at least one" means more, that is, a plurality of optical splitters are included in the ODN, the port identification apparatus may determine, in the foregoing manner, a first wavelength corresponding to another optical splitter in the at least one optical splitter.

It should be noted herein that, in this embodiment of this application, if nominal center wavelengths of reflection components of ports of different optical splitters belonging to a same level of optical splitters are different, the port identification apparatus may determine, based on the foregoing first correspondences, first wavelengths corresponding to the optical splitters. If nominal center wavelengths of reflection components of ports of different optical splitters belonging to a same level of optical splitters are the same, and distances between the tunable OTDR and the different optical splitters are different, the port identification apparatus may also determine, based on the foregoing first correspondence, first wavelengths corresponding to the optical splitters. If nominal center wavelengths of reflection components of ports of different optical splitters belonging to a same level of optical splitters are the same, and distances between the tunable OTDR and the different optical splitters are the same, first wavelengths corresponding to the optical splitters cannot be determined based on the foregoing first correspondences, because an optical splitter corresponding to a first wavelength cannot be distinguished. Herein, that nominal center wavelengths of reflection components of ports of different optical splitters belonging to a same level of optical splitters are different means that an optical splitter 1 and an optical splitter 2 belong to a second level of optical splitters, the optical splitter 1 and the optical splitter 2 are both 1*2 optical splitters, nominal center wavelengths of reflection components of two ports of the optical splitter 1 are a wavelength 1 and a wavelength 2, and nominal center wavelengths of reflection components of two ports of the optical splitter 2 are a wavelength 3 and a wavelength 4. Herein, that nominal center wavelengths of reflection components of ports of different optical splitters belonging to a same level of optical splitters are the same means that an optical splitter 3 and an optical splitter 4 belong to a second level of optical splitters, the optical splitter 3 and the optical splitter 4 are both 1*2 optical splitters, nominal center wavelengths of reflection components of two ports of the optical splitter 3 are a wavelength 1 and a wavelength 2, and nominal center wavelengths of reflection components of two ports of the optical splitter 4 are the wavelength 1 and the wavelength 2.

In step 602, the port identification apparatus may determine the center wavelength shift of the reflection component of each port of the optical splitter in the following manner.

For each optical splitter, the port identification apparatus determines a difference between the first wavelength corresponding to the optical splitter and the nominal center wavelength of the reflection component of the target port of the optical splitter as the center wavelength shift of the reflection component of each port of the optical splitter.

For any optical splitter, the port identification apparatus may determine a difference between a first wavelength corresponding to the optical splitter and a nominal center wavelength of a reflection component of a target port of the optical splitter, and determine the difference as a center wavelength shift of a reflection component of each port of the optical splitter. Because reflection components of all ports of a same optical splitter are relatively close to each other, temperature changes of the reflection components of all the ports are the same. Therefore, a center wavelength shift of a reflection component of only one port (that is, a target port) needs to be tested, to obtain current center wavelengths of the reflection components of all the ports of the optical splitter.

In step 604, to more accurately identify the port connected to the ONT in the ODN, the port connected to the ONT in the ODN may be determined in the following manner.

The port identification apparatus obtains first power respectively detected by the target ONT when test optical signals of a plurality of groups of sub-wavelengths are transmitted in the ODN, where each group of sub-wavelengths is determined based on a current center wavelength of a reflection component of a port of the at least one optical splitter, and a distance between each sub-wavelength of any group of sub-wavelengths and a current center wavelength of a reflection component of a port corresponding to the any group of sub-wavelengths is less than a target value; and if first power less than a target threshold exists in a plurality of pieces of first power corresponding to a target group of sub-wavelengths, determines that the port connected to the target ONT in the ODN is a port to which a center wavelength corresponding to the target group of sub-wavelengths belongs.

The target value may be preset. The target threshold may be preset. When both a service optical signal and a test optical signal exist, the target threshold may be set to power at which the service optical signal reaches the ONT. When only the test optical signal exists, the target threshold may be set to a preset value, and the preset value is relatively small.

In this embodiment, for a reflection component of each port of any optical splitter in the ODN, the tunable OTDR may determine, based on a current center wavelength of the reflection component of each port, a group of sub-wavelengths corresponding to the current center wavelength. For a current center wavelength of a reflection component of any port, the tunable OTDR may determine a sum of the current center wavelength and the target value, to obtain a second value, and determine a difference between the current center wavelength and the target value, to obtain a third value. The tunable OTDR obtains a preset quantity of wavelengths (the preset quantity may be 10 or the like) at an equal interval between the second value and the third value. The preset quantity of wavelengths may include the second value and the third value. Then, the tunable OTDR may transmit, based on a preset sequence, test optical signals of a group of sub-wavelengths corresponding to a current center wavelength of each reflection component. In addition, the tunable OTDR may notify the port identification apparatus of the preset sequence.

Figure 8:
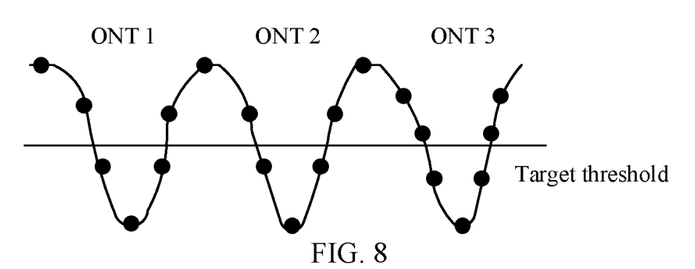
FIG. 8 is a diagram of power detected by an ONT according to an example embodiment of this application.

A test optical signal of any sub-wavelength is transmitted in the ODN, and an ONT connected to the ODN may detect first power of a test optical signal received by the ONT. In this way, the target ONT may detect the first power of the test optical signal of each sub-wavelength in each group of sub-wavelengths. The target ONT sends each detected first power to the port identification apparatus. In this way, the port identification apparatus may obtain first power detected by the target ONT when a plurality of groups of sub-wavelengths are transmitted in the ODN. For example, as shown in FIG. 8, the ODN is connected to three ONTs (an ONT 1, an ONT 2, and an ONT 3). For a group of sub-wavelengths corresponding to a center wavelength of a reflection component of a port connected to an ONT in the ODN, all the three ONTs may detect a plurality of pieces of first power.

For the target ONT, the port identification apparatus may determine whether first power less than the target threshold exists in a plurality of pieces of first power corresponding to each group of sub-wavelengths, and if first power less than the target threshold exists in a plurality of pieces of first power corresponding to a target group of sub-wavelengths, the port identification apparatus may determine that the port connected to the target ONT in the ODN is a port to which a center wavelength corresponding to the target group of sub-wavelengths belongs, that is, a port at which a reflection component to which a current center wavelength of the target group of sub-wavelengths belongs is located. In addition, if no first power less than the target threshold exists in a plurality of pieces of first power corresponding to any group of sub-wavelengths, it may be determined that identification of the port connected to the target ONT in the ODN fails. Herein, if receive power detected by the target ONT is less than the target threshold, it indicates that a test optical signal corresponding to the receive power is reflected by a reflection component, and does not reach the target ONT. Therefore, it may be determined that the target ONT is connected to a port at which the reflection component is located.

In this way, when a port is identified, a test optical signal of one wavelength is converted into test optical signals of a plurality of sub-wavelengths for identification, so that port identification accuracy can be improved.

It should be noted herein that in the foregoing description, the tunable OTDR determines a group of sub-wavelengths corresponding to a current center wavelength of a reflection component. Certainly, the port identification apparatus may alternatively determine a plurality of groups of sub-wavelengths in the same manner as the tunable OTDR. Then, the port recognition apparatus notifies the tunable OTDR of the plurality of groups of sub-wavelengths and the preset sequence.

In this embodiment of this application, a center wavelength of a reflection component disposed at a port of the at least one optical splitter in the ODN may be calibrated, so that the port connected to the ONT in the ODN is more accurately identified. In addition, in this embodiment of this application, because the center wavelength of the reflection component may be calibrated, it is unnecessary to use reflection components whose center wavelength spacing is relatively large (to prevent different reflection components from reflecting, due to a relatively small center wavelength spacing, a test optical signal of a center wavelength of another reflection component when a temperature changes), and a center wavelength spacing between reflection components can be smaller, to reduce a wavelength scanning range of the tunable OTDR, thereby reducing manufacturing difficulty and costs of the tunable OTDR, and achieving high productization feasibility.

Figure 9:
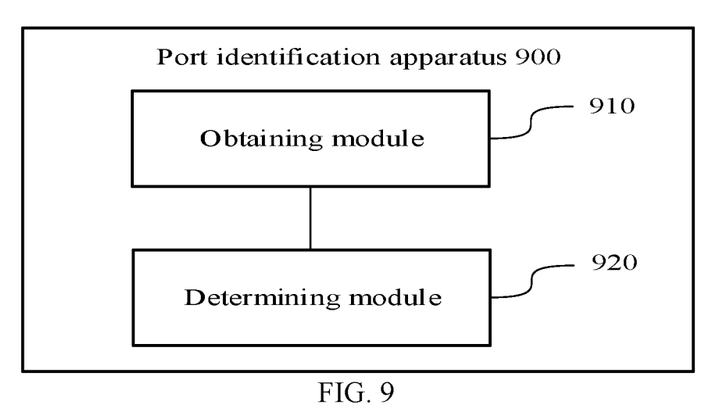
FIG. 9 is a diagram of a structure of a port identification apparatus according to an example embodiment of this application.

FIG. 9 is a diagram of a structure of a port identification apparatus 900 according to an embodiment of this application. The apparatus may be implemented as a part or a whole of the apparatus by using software, hardware, or a combination of the two. The apparatus is applied to an ODN. The apparatus provided in this embodiment of this application may implement the procedure in FIG. 6 in the embodiments of this application. The apparatus 900 includes an obtaining module 910 and a determining module 920.

The obtaining module 910 is configured to obtain a first wavelength respectively corresponding to at least one optical splitter in the ODN, where for each optical splitter, the first wavelength is a wavelength corresponding to a test optical signal with maximum receive power after being reflected by a reflection component of a target port of the optical splitter during transmission in the ODN; and may be configured to implement an obtaining function in step 601 and an implicit step included in step 601.

The determining module 920 is configured to determine a center wavelength shift of a reflection component of each port of the at least one optical splitter based on the first wavelength corresponding to the at least one optical splitter and a nominal center wavelength of a reflection component of a target port of the at least one optical splitter; determine a current center wavelength of the reflection component of each port of the at least one optical splitter based on the center wavelength shift of the reflection component of each port of the at least one optical splitter; and determine, based on the current center wavelength of the reflection component of each port of the at least one optical splitter in the ODN, a port connected to a target optical network terminal ONT in the ODN; and may be configured to implement a determining function in step 602 to step 604 and an implicit step included in step 602 to step 604.

In an embodiment, the obtaining module 910 is configured to:
 obtain a plurality of first correspondences respectively corresponding to the at least one optical splitter in the ODN, where for each optical splitter, each first correspondence is a correspondence between receive power after reflection and/or scattering and transmission distances when test optical signals of a plurality of wavelengths are respectively transmitted in the ODN, the plurality of wavelengths include a second wavelength, the second wavelength is a nominal center wavelength of a reflection component of any port of the optical splitter, and a wavelength in the plurality of wavelengths other than the second wavelength is determined based on the second wavelength and an adjustment value; and
 determine, for each of the at least one optical splitter in a plurality of first correspondences corresponding to the optical splitter, a first correspondence with maximum receive power at a location of the reflection component of the port of the optical splitter, and determine a wavelength corresponding to the first correspondence with the maximum receive power as the first wavelength corresponding to the optical splitter.

In an embodiment, the determining module 920 is configured to:
 obtain first power respectively detected by the target ONT when test optical signals of a plurality of groups of sub-wavelengths are transmitted in the ODN, where each group of sub-wavelengths is determined based on a current center wavelength of a reflection component of a port of the at least one optical splitter, and a distance between each sub-wavelength of any group of sub-wavelengths and a current center wavelength of a reflection component of a port corresponding to the any group of sub-wavelengths is less than a target value; and
 if first power less than a target threshold exists in a plurality of pieces of first power corresponding to a target group of sub-wavelengths, determine that the port connected to the target ONT in the ODN is a port to which a center wavelength corresponding to the target group of sub-wavelengths belongs.

In an embodiment, the determining module 920 is configured to:
 for each optical splitter, determine a difference between a first wavelength corresponding to the optical splitter and a nominal center wavelength of the reflection component of the target port of the optical splitter as a center wavelength shift of a reflection component of each port of the optical splitter.

Division into the modules in embodiments of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

All or some of the foregoing embodiments may be implemented by using software, hardware, firmware, or any combination thereof. When software is used for implementation, all or some of the embodiments may be implemented in a form of a computer program product. The computer program product includes one or more computer instructions, and when the computer program instructions are loaded and executed on an OLT, all or some of the processes or functions described in the embodiments of this application are generated. The computer instructions may be stored in a computer-readable storage medium, or transmitted from one computer-readable storage medium to another computer-readable storage medium. The computer-readable storage medium may be any usable medium accessible by an OLT, or a data storage device, such as a server or a data center, integrating one or more usable media. The usable medium may be a magnetic medium (such as a floppy disk, a hard disk, or a magnetic tape) or an optical medium (such as a digital video disk (DVD)) or a semiconductor medium (such as a solid-state drive).

What is claimed is:

1. A port identification method, applied to an optical distribution network ODN, wherein the method comprises:
 obtaining a first wavelength respectively corresponding to at least one optical splitter in the ODN, wherein for each optical splitter, the first wavelength is a wavelength corresponding to a test optical signal with maximum receive power after being reflected by a reflection component of a target port of the optical splitter during transmission in the ODN;
 determining a center wavelength shift of a reflection component of each port of the at least one optical splitter based on the first wavelength corresponding to the at least one optical splitter and a nominal center wavelength of a reflection component of a target port of the at least one optical splitter;
 determining a current center wavelength of the reflection component of each port of the at least one optical splitter based on the center wavelength shift of the reflection component of each port of the at least one optical splitter; and
 determining, based on the current center wavelength of the reflection component of each port of the at least one optical splitter in the ODN, a port connected to a target optical network terminal ONT in the ODN.

2. The method according to claim 1, wherein the obtaining a first wavelength respectively corresponding to at least one optical splitter in the ODN comprises:

obtaining a plurality of first correspondences respectively corresponding to the at least one optical splitter in the ODN, wherein for each optical splitter, each first correspondence is a correspondence between receive power after backscattering and/or reflection and transmission distances when test optical signals of a plurality of wavelengths are respectively transmitted in the ODN, the plurality of wavelengths comprise a second wavelength, the second wavelength is a nominal center wavelength of a reflection component of any port of the optical splitter, and a wavelength in the plurality of wavelengths other than the second wavelength is determined based on the second wavelength and a target adjustment value; and determining, for each optical splitter in a plurality of first correspondences corresponding to the optical splitter, a first correspondence with maximum receive power at a location of the reflection component of the target port of the optical splitter, and determining a wavelength corresponding to the first correspondence with the maximum receive power as the first wavelength corresponding to the optical splitter.

3. The method according to claim 1, wherein the determining, based on the current center wavelength of the reflection component of each port of the at least one optical splitter in the ODN, a port connected to a target ONT in the ODN comprises:

obtaining first power respectively detected by the target ONT when test optical signals of a plurality of groups of sub-wavelengths are transmitted in the ODN, wherein each group of sub-wavelengths is determined based on a current center wavelength of a reflection component of a port of the at least one optical splitter, and a distance between each sub-wavelength of any group of sub-wavelengths and a current center wavelength of a reflection component of a port corresponding to the any group of sub-wavelengths is less than a target value; and if first power less than a target threshold exists in a plurality of pieces of first power corresponding to a target group of sub-wavelengths, determining that the port connected to the target ONT in the ODN is a port to which a center wavelength corresponding to the target group of sub-wavelengths belongs.

4. The method according to claim 1, wherein the determining a center wavelength shift of a reflection component of each port of the at least one optical splitter based on the first wavelength corresponding to the at least one optical splitter and a nominal center wavelength of a reflection component of a target port of the at least one optical splitter comprises:

for each optical splitter, determining a difference between a first wavelength corresponding to the optical splitter and a nominal center wavelength of the reflection component of the target port of the optical splitter as a center wavelength shift of a reflection component of each port of the optical splitter.

5. A port identification apparatus, applied to an optical distribution network ODN, wherein the apparatus comprises a processor and a memory:

the processor is configured to:
obtain a first wavelength respectively corresponding to at least one optical splitter in the ODN, wherein for each optical splitter, the first wavelength is a wavelength corresponding to a test optical signal with maximum receive power after being reflected by a reflection component of a target port of the optical splitter during transmission in the ODN;

determine a center wavelength shift of a reflection component of each port of the at least one optical splitter based on the first wavelength corresponding to the at least one optical splitter and a nominal center wavelength of a reflection component of a target port of the at least one optical splitter;

determine a current center wavelength of the reflection component of each port of the at least one optical splitter based on the center wavelength shift of the reflection component of each port of the at least one optical splitter; and determine, based on the current center wavelength of the reflection component of each port of the at least one optical splitter in the ODN, a port connected to a target optical network terminal ONT in the ODN.

6. The apparatus according to claim 5, wherein the processor is further configured to:

obtain a plurality of first correspondences respectively corresponding to the at least one optical splitter in the ODN, wherein for each optical splitter, each first correspondence is a correspondence between receive power after backscattering and/or reflection and transmission distances when test optical signals of a plurality of wavelengths are respectively transmitted in the ODN, the plurality of wavelengths comprise a second wavelength, the second wavelength is a nominal center wavelength of a reflection component of any port of the optical splitter, and a wavelength in the plurality of wavelengths other than the second wavelength is determined based on the second wavelength and a target adjustment value; and determine, for each optical splitter in a plurality of first correspondences corresponding to the optical splitter, a first correspondence with maximum receive power at a location of the reflection component of the target port of the optical splitter, and determine a wavelength corresponding to the first correspondence with the maximum receive power as the first wavelength corresponding to the optical splitter.

7. The apparatus according to claim 5, wherein the processor is further configured to:

obtain first power respectively detected by the target ONT when test optical signals of a plurality of groups of sub-wavelengths are transmitted in the ODN, wherein each group of sub-wavelengths is determined based on a current center wavelength of a reflection component of a port of the at least one optical splitter, and a distance between each sub-wavelength of any group of sub-wavelengths and a current center wavelength of a reflection component of a port corresponding to the any group of sub-wavelengths is less than a target value; and if first power less than a target threshold exists in a plurality of pieces of first power corresponding to a target group of sub-wavelengths, determine that the port connected to the target ONT in the ODN is a port to which a center wavelength corresponding to the target group of sub-wavelengths belongs.

8. The apparatus according to claim 5, wherein the processor is further configured to:

for each optical splitter, determine a difference between a first wavelength corresponding to the optical splitter and a nominal center wavelength of the reflection component of the target port of the optical splitter as a center wavelength shift of a reflection component of each port of the optical splitter.

9. A port identification system, applied to an optical distribution network ODN, wherein the system comprises a tunable optical time domain reflectometer OTDR and an optical line terminal OLT, wherein
the tunable OTDR is configured to output test optical signals of a plurality of wavelengths;
the tunable OTDR is further configured to detect receive power and a receiving time of a received test optical signal;
the OLT establishes a communications connection to the tunable OTDR; and
the OLT is configured to:
obtain a first wavelength respectively corresponding to at least one optical splitter in the ODN, wherein for each optical splitter, the first wavelength is a wavelength corresponding to a test optical signal with maximum receive power after being reflected by a reflection component of a target port of the optical splitter during transmission in the ODN;
determine a center wavelength shift of a reflection component of each port of the at least one optical splitter based on the first wavelength corresponding to the at least one optical splitter and a nominal center wavelength of a reflection component of a target port of the at least one optical splitter;
determine a current center wavelength of the reflection component of each port of the at least one optical splitter based on the center wavelength shift of the reflection component of each port of the at least one optical splitter; and
determine, based on the current center wavelength of the reflection component of each port of the at least one optical splitter in the ODN, a port connected to a target optical network terminal ONT in the ODN.

10. The port identification system according to claim 9, wherein the OLT is further configured to:
obtain a plurality of first correspondences respectively corresponding to the at least one optical splitter in the ODN, wherein for each optical splitter, each first correspondence is a correspondence between receive power after backscattering and/or reflection and transmission distances when test optical signals of a plurality of wavelengths are respectively transmitted in the ODN, the plurality of wavelengths comprise a second wavelength, the second wavelength is a nominal center wavelength of a reflection component of any port of the optical splitter, and a wavelength in the plurality of wavelengths other than the second wavelength is determined based on the second wavelength and a target adjustment value; and
determine, for each optical splitter in a plurality of first correspondences corresponding to the optical splitter, a first correspondence with maximum receive power at a location of the reflection component of the target port of the optical splitter, and determine a wavelength corresponding to the first correspondence with the maximum receive power as the first wavelength corresponding to the optical splitter.

11. The port identification system according to claim 9, wherein the OLT is further configured to:
obtain first power respectively detected by the target ONT when test optical signals of a plurality of groups of sub-wavelengths are transmitted in the ODN, wherein each group of sub-wavelengths is determined based on a current center wavelength of a reflection component of a port of the at least one optical splitter, and a distance between each sub-wavelength of any group of sub-wavelengths and a current center wavelength of a reflection component of a port corresponding to the any group of sub-wavelengths is less than a target value; and
if first power less than a target threshold exists in a plurality of pieces of first power corresponding to a target group of sub-wavelengths, determine that the port connected to the target ONT in the ODN is a port to which a center wavelength corresponding to the target group of sub-wavelengths belongs.

12. The port identification system according to claim 9, wherein the OLT is further configured to:
for each optical splitter, determine a difference between a first wavelength corresponding to the optical splitter and a nominal center wavelength of the reflection component of the target port of the optical splitter as a center wavelength shift of a reflection component of each port of the optical splitter.

* * * * *